US012663791B2

(12) United States Patent
Wang et al.

(10) Patent No.: US 12,663,791 B2
(45) Date of Patent: Jun. 23, 2026

(54) SYSTEMS AND METHODS FOR COMMUNICATION OF VEHICLE CONTROL INFORMATION BETWEEN A VEHICLE AND AN ELECTRONIC DEVICE

(71) Applicant: Huawei Technologies Co., Ltd., Shenzhen (CN)

(72) Inventors: Sishan Wang, Shenzhen (CN); Haibo Liu, Shenzhen (CN); Shuaihong Gao, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 459 days.

(21) Appl. No.: 18/043,430

(22) PCT Filed: Aug. 20, 2021

(86) PCT No.: PCT/CN2021/113683
§ 371 (c)(1),
(2) Date: Feb. 28, 2023

(87) PCT Pub. No.: WO2022/048456
PCT Pub. Date: Mar. 10, 2022

(65) Prior Publication Data
US 2023/0324904 A1 Oct. 12, 2023

(30) Foreign Application Priority Data

Sep. 4, 2020 (CN) .......................... 202010932361.5

(51) Int. Cl.
| *G05D 1/00* | (2024.01) |
| *H04L 9/40* | (2022.01) |
| *H04W 4/40* | (2018.01) |

(52) U.S. Cl.
CPC ......... *G05D 1/0022* (2013.01); *G05D 1/0016* (2013.01); *H04L 63/0435* (2013.01); *H04W 4/40* (2018.02)

(58) Field of Classification Search
CPC ..... G05D 1/0022; G05D 1/0016; H04W 4/40; H04L 63/0435
See application file for complete search history.

(56) References Cited

U.S. PATENT DOCUMENTS

| 2014/0094117 A1* | 4/2014 | Rajendran ............. | H04W 12/35 |
| | | | 455/41.1 |
| 2021/0377261 A1* | 12/2021 | Lee ......................... | B60R 25/24 |

FOREIGN PATENT DOCUMENTS

| CN | 103825630 A | 5/2014 |
| CN | 111476924 A | 7/2020 |
| WO | 2018186512 A1 | 10/2018 |

OTHER PUBLICATIONS

English Translation of WO2018186512A1 Title: System and Method for Controlling Vehicle Using Smart Phone Author: Chae et al. Date: Oct. 11, 2018 (Year: 2018).*

* cited by examiner

*Primary Examiner* — Steven Vu Nguyen
(74) *Attorney, Agent, or Firm* — WOMBLE BOND DICKINSON (US) LLP

(57) ABSTRACT

This application provides a vehicle control method. The method Can include a mobile terminal that establishes a short-range communication connection to a vehicle. The mobile terminal reads vehicle information from a passive NFC apparatus in the vehicle. The mobile terminal generates control information based on the vehicle information. The mobile terminal sends the control information to the vehicle by using the short-range communication connection. The passive NFC apparatus is, for example, an NFC tag, and the (Continued)

Mobile phone 110 | Vehicle 120

S210: Establish a short-range communication connection

S220: Read vehicle information from a passive NFC apparatus

S230: Generate control information

S240: Send the control information

S250: Control the vehicle mobile terminal is, for example, a mobile phone. In a process of controlling the vehicle, the mobile phone may be in a screen-off state throughout the process, and the user does not need to perform an operation in an interface of the mobile phone, thereby enhancing the user's experience.

12 Claims, 7 Drawing Sheets

SYSTEMS AND METHODS FOR COMMUNICATION OF VEHICLE CONTROL INFORMATION BETWEEN A VEHICLE AND AN ELECTRONIC DEVICE

CROSS-REFERENCE TO RELATED APPLICATIONS

This application is a National Stage of International Patent Application No. PCT/CN2021/113683, filed on Aug. 20, 2021, which claims priority to Chinese Patent Application No. 202010932361.5, filed on Sep. 4, 2020, both of which are hereby incorporated by reference in their entireties.

TECHNICAL FIELD

This application relates to the field of electronic technologies, and in particular, to a vehicle control method and an electronic device.

BACKGROUND

With the improvement of automobile intelligence, digital keys (DK) have emerged. A user may implement a DK function by using a mobile terminal such as a mobile phone or a wearable device. For example, the user may control, by using the mobile phone, a vehicle to perform functions such as unlocking, locking, and starting an engine, thereby enhancing user experience.

According to a method for controlling a vehicle by using a mobile phone, the mobile phone establishes a Bluetooth connection to the vehicle, and then sends an instruction to the vehicle by using the Bluetooth connection based on an operation performed by a user in an interface of the mobile phone, to control the vehicle to implement a specific function. For example, if the user taps an icon for opening a vehicle door in the interface of the mobile phone, the mobile phone sends an instruction for opening the vehicle door to the vehicle by using a Bluetooth connection, to control the vehicle to open the vehicle door. In this method, a user needs to perform an operation in an interface of the mobile phone, and user experience needs to be enhanced.

SUMMARY

This application provides a vehicle control method and an electronic device, to enhance user experience.

According to a first aspect, a vehicle control method is provided, including: A mobile terminal establishes a short-range communication connection to a vehicle. The mobile terminal reads vehicle information from a passive near field communication (NFC) apparatus on the vehicle. The mobile terminal generates control information based on the vehicle information. The mobile terminal sends the control information to the vehicle by using the short-range communication connection.

The passive NFC apparatus is, for example, an NFC tag, and the mobile terminal is, for example, a mobile phone. A user may control a mobile phone to approach an NFC tag. An NFC module of the mobile phone emits an electromagnetic wave to stimulate the NFC tag to work, receives a signal transmitted by the NFC tag, and decodes the signal to obtain vehicle information. When the vehicle information includes task information for opening a vehicle door, control information may include an instruction for opening the vehicle door. When the vehicle information includes the task information for opening a trunk, the control information may include an instruction for opening the trunk. In a process of controlling the vehicle, the mobile phone may be in a screen-off state throughout the process, and the user does not need to perform an operation in an interface of the mobile phone, thereby enhancing user experience. In addition, the vehicle does not need to be provided with an active NFC apparatus, thereby reducing vehicle costs and improving reliability of a vehicle control system.

In embodiments, the vehicle information includes task information, the task information is in an association relationship with a position of the passive NFC apparatus in the vehicle, and the task information is used to generate the control information.

For example, task information in an NFC tag located on a vehicle door is to open the vehicle door, and the mobile phone may generate, based on the task information, an instruction for opening the vehicle door. Task information in an NFC tag located on a trunk is to open the trunk, and the mobile phone may generate, based on the task information, an instruction for opening the trunk. The user can complete a specific task without performing an operation on the mobile phone, thereby enhancing user experience.

In embodiments, the task information is random identification information, and the control information includes the random identification information.

For example, the vehicle stores a task mapping table, and the task mapping table includes a mapping relationship between random identification information and a to-be-executed task. After a Bluetooth connection is established, a vehicle-end DK authentication system may query the task mapping table, and determine that random identification information corresponding to the task for opening a front door is "2". In this case, the vehicle-end DK authentication system writes the random identification information "2" into the NFC tag on the front door. Because the random identification information is written into the NFC tag after the Bluetooth connection is established, an NFC card reader cannot obtain the random identification information corresponding to the task in advance, thereby enhancing security of the vehicle control system.

In embodiments, the vehicle information includes an identifier of the vehicle, and/or the vehicle information includes an identifier of an application program (APP) corresponding to the vehicle information.

When the user has a plurality of vehicles, the vehicle information including the vehicle identifier can help the mobile phone determine which vehicle the vehicle information comes from, without a need to turn on the screen to prompt the user to perform selection. When the vehicle information includes an identifier of a corresponding APP, an NFC tag distribution system may directly forward the vehicle information to the APP, without a need to turn on the screen to prompt the user to perform selection. Therefore, in this embodiment, a user can control a vehicle without perception, thereby enhancing user experience.

In embodiments, the control information is information encrypted with a session key.

The mobile phone may perform security verification on the short-range communication connection, and generate a session key after the security verification succeeds. The control information encrypted based on the session key can enhance security of the vehicle control system.

According to a second aspect, another vehicle control method is provided, including: A vehicle-mounted electronic device establishes a short-range communication connection to a mobile terminal. The vehicle-mounted electronic device receives control information from the mobile terminal by using the short-range communication connection, where the control information is generated by the mobile terminal based on vehicle information, and the vehicle information is information in a passive NFC apparatus in a vehicle on which the vehicle-mounted electronic device is located. The vehicle-mounted electronic device controls the vehicle based on the control information.

The passive NFC apparatus is, for example, an NFC tag, and the mobile terminal is, for example, a mobile phone. A user may control a mobile phone to approach an NFC tag. An NFC module of the mobile phone emits an electromagnetic wave to stimulate the NFC tag to work, receives a signal transmitted by the NFC tag, and decodes the signal to obtain vehicle information. When the vehicle information includes task information for opening a vehicle door, control information may include an instruction for opening the vehicle door. When the vehicle information includes the task information for opening a trunk, the control information may include an instruction for opening the trunk. In a process of controlling the vehicle, the mobile phone may be in a screen-off state throughout the process, and the user does not need to perform an operation in an interface of the mobile phone, thereby enhancing user experience. In addition, the vehicle does not need to be provided with an active NFC apparatus, thereby reducing vehicle costs and improving reliability of a vehicle control system.

In embodiments, the vehicle information includes task information, the task information is in an association relationship with a position of the passive NFC apparatus in the vehicle, and the task information is used to generate the control information.

For example, task information in an NFC tag located on a vehicle door is to open the vehicle door, and the mobile phone may generate, based on the task information, an instruction for opening the vehicle door. Task information in an NFC tag located on a trunk is to open the trunk, and the mobile phone may generate, based on the task information, an instruction for opening the trunk. The user can complete a specific task without performing an operation on the mobile phone, thereby enhancing user experience.

In embodiments, the task information is random identification information, and the control information includes the random identification information.

For example, the vehicle stores a task mapping table, and the task mapping table includes a mapping relationship between random identification information and a to-be-executed task. After a Bluetooth connection is established, a vehicle-end DK authentication system may query the task mapping table, and determine that random identification information corresponding to the task for opening a front door is "2". In this case, the vehicle-end DK authentication system writes the random identification information "2" into the NFC tag on the front door. Because the random identification information is written into the NFC tag after the Bluetooth connection is established, an NFC card reader cannot obtain the random identification information corresponding to the task in advance, thereby enhancing security of the vehicle control system.

In embodiments, the vehicle information includes an identifier of the vehicle, and/or the vehicle information includes an identifier of an application program corresponding to the vehicle information.

When the user has a plurality of vehicles, the vehicle information including the vehicle identifier can help the mobile phone determine which vehicle the vehicle information comes from, without a need to turn on the screen to prompt the user to perform selection. When the vehicle information includes an identifier of a corresponding APP, an NFC tag distribution system may directly forward the vehicle information to the APP, without a need to turn on the screen to prompt the user to perform selection. Therefore, in this embodiment, a user can control a vehicle without perception, thereby enhancing user experience.

In embodiments, the control information is information encrypted with a session key.

The mobile phone may perform security verification on the short-range communication connection, and generate a session key after the security verification succeeds. The control information encrypted based on the session key can enhance security of the vehicle control system.

In embodiments, the vehicle information is information written into the passive NFC apparatus after the short-range communication connection is established.

Because a communication distance of the short-range communication connection is relatively short, after the connection is established, it indicates that the user is relatively close to the vehicle. In this case, writing the vehicle information into the NFC tag can prevent the vehicle information from being read by an unauthorized NFC device, thereby enhancing security of the vehicle control system.

According to a third aspect, a vehicle control apparatus is provided, including a unit including software and/or hardware. The unit is configured to perform any method in the technical solution according to the first aspect.

According to a fourth aspect, another vehicle control apparatus is provided, including a unit composed of software and/or hardware. The unit is configured to perform any method in the technical solution according to the second aspect.

According to a fifth aspect, an electronic device is provided, including a processor and a memory. The memory is configured to store a computer program, and the processor is configured to invoke the computer program from the memory and run the computer program, so that the electronic device performs any method in the technical solutions according to the first aspect.

According to a sixth aspect, an electronic device is provided, including a processor and a memory. The memory is configured to store a computer program, and the processor is configured to invoke the computer program from the memory and run the computer program, so that the electronic device performs any method in the technical solution according to the second aspect.

According to a seventh aspect, a computer-readable medium is provided. The computer-readable medium stores program code, and when the computer program code is run on an electronic device, the electronic device is enabled to perform any method in the technical solution according to the first aspect.

According to an eighth aspect, a computer-readable medium is provided. The computer-readable medium stores program code, and when the computer program code is run on an electronic device, the electronic device is enabled to perform any method in the technical solution according to the second aspect.

According to a ninth aspect, a computer program product is provided. The computer program product includes computer program code, and when the computer program code is run on an electronic device, the electronic device is enabled to perform any method in the technical solution according to the first aspect.

According to a tenth aspect, a computer program product is provided. The computer program product includes computer program code, and when the computer program code is run on an electronic device, the electronic device is enabled to perform any method in the technical solution according to the second aspect.

DESCRIPTION OF EMBODIMENTS

The following describes technical solutions of this application with reference to the accompanying drawings.

Figure 1:
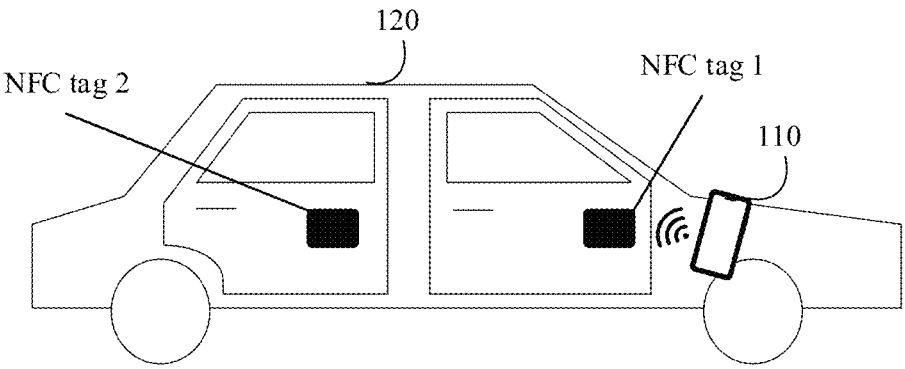
FIG. 1 is a schematic diagram of a vehicle control system according to this application.

FIG. 1 is a schematic diagram of a vehicle control system applicable to this application.

A mobile phone 110 is a mobile device with an active NFC function, and can send data and receive data by using an NFC module.

A vehicle 120 is a device with a passive NFC function. The passive NFC function may be implemented by using an NFC tag, and the NFC tag can send data without using a power supply. The passive NFC function may also be implemented by simulating an NFC tag by using an active NFC apparatus.

When the mobile phone 110 and the vehicle 120 work cooperatively, the NFC module of the mobile phone 110 emits an electromagnetic wave, and the NFC tag sends data by using energy of the electromagnetic wave, so that the NFC module of the mobile phone 110 receives the data. In the working mode, the mobile phone 110 is equivalent to a card reader, and can read data in the NFC tag. Therefore, the working mode may also be referred to as a card reader mode.

The NFC tag may be located at any position outside or inside the vehicle 120, and information related to the position may be written into the NFC tag. For example, if an NFC tag 1 is located on a front door of the vehicle 120, information in the NFC tag 1 may include an identifier of the front door and task information related to an operation on the front door, and the task information is used to generate an instruction (for example, an instruction for opening the front door). If an NFC tag 2 is located on a rear door of the vehicle 120, information in the NFC tag 2 may include an identifier of the rear door and task information related to an operation on the rear door, and the task information is used to generate an instruction (for example, an instruction for opening the rear door). The vehicle 120 may also simulate an NFC tag by using an NFC device.

In addition to performing communication by using NFC, the mobile phone 110 and the vehicle 120 may further perform communication by using another short-range communications technology.

For example, both the mobile phone 110 and the vehicle 120 include a Bluetooth module. In this case, a Bluetooth connection may be established between the mobile phone 110 and the vehicle 120. The mobile phone 110 may send data to the vehicle 120 by using the Bluetooth connection, and the vehicle 120 may also send data to the mobile phone 110 by using the Bluetooth connection.

In addition to performing communication by using the Bluetooth connection, the mobile phone 110 and the vehicle 120 may further communicate by using an ultra-wideband (UWB) technology, a ZigBee technology, or a Wireless Fidelity (Wi-Fi) technology. A short-range communication technology in a vehicle control system is not limited in this application. In addition, the vehicle control system including the mobile phone 110 and the vehicle 120 is an example applicable to this application. The mobile phone 110 may be another mobile device having an active NFC function, for example, a wearable device such as a smartwatch or a smart band. The vehicle 120 may also be another vehicle having a passive NFC function, for example, a motorcycle or a bicycle.

Figure 2:
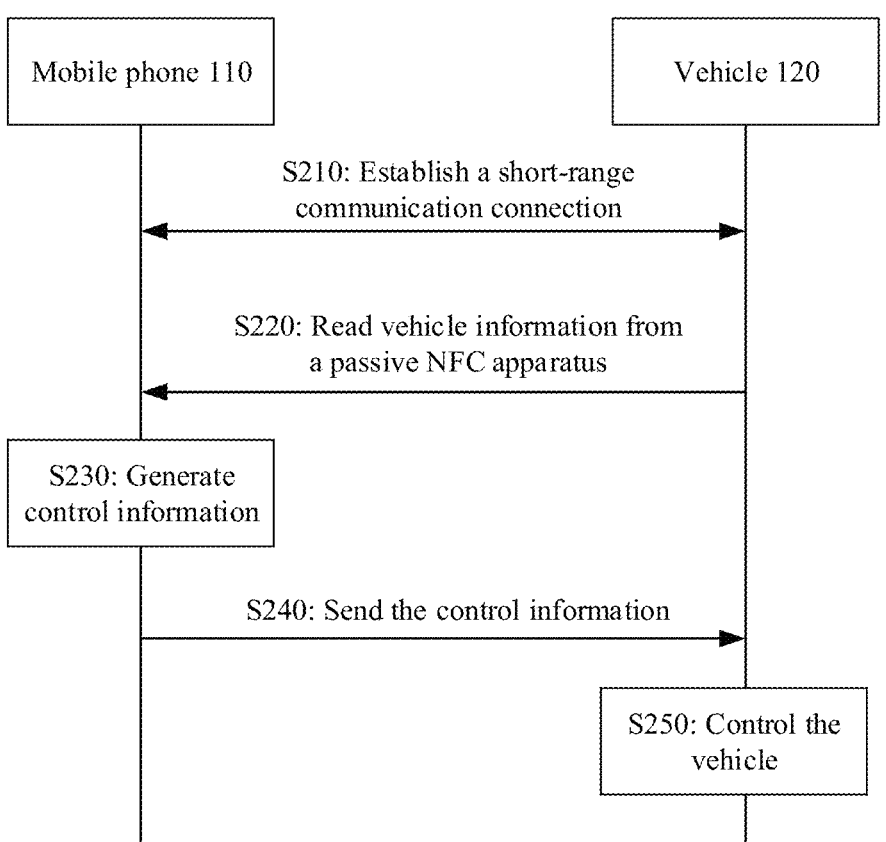
FIG. 2 is a schematic diagram of a vehicle control method according to this application.

The following describes in detail the vehicle control method provided in this application by using an example in which the mobile phone 110 controls the vehicle 120. As shown in FIG. 2, the method includes the following operations.

S210: The mobile phone 110 establishes a short-range communication connection to the vehicle 120.

The short-range communication connection is, for example, a Bluetooth connection. The mobile phone 110 and the vehicle 120 may first establish a physical layer channel by performing operations such as creating a connection (e.g., a create connection operation), requesting a connection (e.g., a connection request operation), and setting completion (e.g., a setup complete operation). The physical layer channel may also be referred to as a physical link, is a concept in a baseband protocol, and includes an asynchronous link (ACL) and a synchronization link (SCO). The ACL may be used to transmit data having a relatively low delay requirement, for example, packet data. The SCO may be used to transmit data having a relatively high delay requirement, for example, voice data.

After the physical layer channel is established, a logical link control and adaptation protocol (L2CAP) connection needs to be established between the mobile phone 110 and the vehicle 120, so that an application layer of the mobile phone 110 can communicate with an application layer of the vehicle 120. The L2CAP connection belongs to a logical channel. An endpoint of the logical channel may be represented by using a channel identifier (CID). Each application (e.g., profile) instance of the Bluetooth device needs to obtain a CID to establish an application layer connection.

In embodiments, after the physical layer channel is established, the mobile phone 110 may further perform an operation of authentication with the vehicle 120, to perform bidirectional authentication based on a DK service key, and generate a session key. The session key may be stored in a secure storage environment of the mobile phone 110. The secure storage environment is, for example, a secure element (SE), a trusted execution environment (TEE), or a secure white box.

After the authentication succeeds, the mobile phone 110 establishes an association relationship between the session key, a Bluetooth connection life cycle, and a DK application program, where the DK application program is, for example, a digital wallet. The Bluetooth connection life cycle is the Bluetooth connection duration. When the Bluetooth connection is disconnected, the Bluetooth life cycle ends and the session key becomes invalid.

After the authentication succeeds, the vehicle 120 writes the vehicle information into the NFC tag by using a vehicle-end DK authentication system. Because a communication distance of the short-range communication connection is relatively short, after the connection is established, it indicates that the user is relatively close to the vehicle. In this case, writing the vehicle information into the NFC tag can prevent the vehicle information from being read by an unauthorized NFC device, thereby enhancing security of the vehicle control system. In embodiments, the vehicle information may also be preset in the NFC tag.

The vehicle information may include task information, the task information is in an association relationship with a position of the NFC tag in the vehicle 120, and the task information is used to generate an instruction for a to-be-executed task. Components at different positions of the vehicle 120 can perform different tasks. For example, a vehicle door can perform a task of opening or closing a vehicle door, and a trunk can perform a task of opening or closing a trunk. The task information is used to indicate a to-be-executed task. Therefore, task information in NFC tags attached at different positions of the vehicle 120 is also different. The "association relationship" may also be interpreted as a relationship in which content of the task information changes with a position of the NFC tag on the vehicle. For example, task information in an NFC tag on a vehicle door is to open the vehicle door, and the mobile phone 110 may generate, based on the task information, an instruction for opening the vehicle door. Task information in an NFC tag on a trunk is to open the trunk, and the mobile phone 110 may generate, based on the task information, an instruction for opening the trunk. Opening the vehicle door and opening the trunk are to-be-executed tasks.

The task information may be random identification information. For example, the vehicle 120 stores a task mapping table, and the task mapping table includes a mapping relationship between random identification information and a to-be-executed task. After a Bluetooth connection is established, a vehicle-end DK authentication system may query the task mapping table, and determine that random identification information corresponding to the task for opening a front door is "2". In this case, the vehicle-end DK authentication system writes the random identification information "2" into the NFC tag 1. Because the random identification information is written into the NFC tag after the Bluetooth connection is established, an NFC card reader cannot obtain the random identification information corresponding to the task in advance, thereby enhancing security of the vehicle control system. In the foregoing example, a mapping relationship between the random identification information and the to-be-executed task is fixed. In embodiments, random identification information associated with the to-be-executed task may also be dynamically generated, that is, random identification information written into a same NFC tag each time is randomly generated.

The vehicle information may further include an application program identifier. The application program identifier is, for example, an identifier of a digital wallet. The digital wallet may register an identifier of the digital wallet in an NFC tag distribution system. After the application program identifier in the vehicle information enters the NFC tag distribution system, the NFC tag distribution system may transmit the vehicle information to the digital wallet.

The NFC tag distribution system may distribute the vehicle information by using the following methods.

When the vehicle information indicates a specific app, the NFC tag distribution system sends the vehicle information to the specific app. For example, when the vehicle information includes data of a uniform resource locator (URL) and/or a multipurpose internet mail extensions (MIME) type, the data indicates a specific APP, and the NFC distribution system may directly send the vehicle information to the APP indicated by the data of the URL and/or the MIME type.

When the vehicle information does not indicate a specific APP, the NFC tag distribution system broadcasts the vehicle information. For example, if data in the vehicle information cannot be mapped to data of a URL or MIME type, the NFC distribution system may broadcast the vehicle information.

The vehicle information may further include other information, for example, a vehicle identifier, so that the mobile phone 110 distinguishes between a plurality of vehicles that belong to the user. For example, two vehicles (a vehicle 1 and a vehicle 2) of a user are parked in a same garage, and the mobile phone 110 establishes a short-range communication connection to each of the two vehicles. The user controls the mobile phone 110 to read an NFC tag on the vehicle 1. Vehicle information in the NFC tag includes a vehicle identifier "vehicle 1". In this case, the mobile phone 110 generates, based on the vehicle identifier, control information for controlling the vehicle 1, so as to avoid a misoperation on the vehicle 2. Specific content of the vehicle information is not limited in this application.

Subsequently, the mobile phone 110 may perform the following operations.

S220: The mobile phone 110 reads vehicle information from a passive NFC apparatus in the vehicle 120.

The passive NFC apparatus is, for example, an NFC tag. A user may control the mobile phone 110 to approach the NFC tag. An NFC module of the mobile phone 110 emits an electromagnetic wave to stimulate the NFC tag to work, receives a signal transmitted by the NFC tag, and decodes the signal to obtain vehicle information.

The passive NFC apparatus may also be an NFC tag simulated by an active NFC apparatus. In this application, the passive NFC apparatus is an apparatus with a passive NFC function, that is, an NFC apparatus that can use an electromagnetic field provided by the mobile phone 110 as an energy transmit signal, or an NFC apparatus that can be used by the mobile phone 110 to read information in a card reader mode.

S230: The mobile phone 110 generates control information based on the vehicle information.

For example, when the vehicle information includes task information for opening a vehicle door, control information may include an instruction for opening the vehicle door. When the vehicle information includes the task information for opening a trunk, the control information may include an instruction for opening the trunk. When the task information is random identification information, the control information may include the random identification information, so that the vehicle 120 determines a to-be-executed task based on the random identification information.

In embodiments, the mobile phone 110 may display a user interface (UI) for the user to select control information that specifically needs to be generated.

Figure 3:
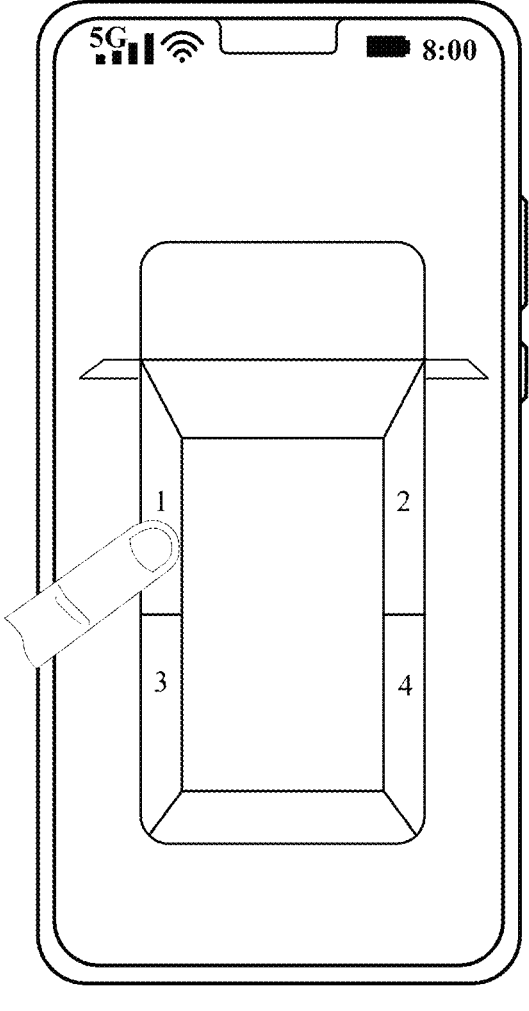
FIG. 3 is a schematic diagram of a vehicle door control method according to this application.

A UI displayed by the mobile phone 110 is shown in FIG. 3. The vehicle 120 has four vehicle doors: a vehicle door 1, a vehicle door 2, a vehicle door 3, and a vehicle door 4. The vehicle door 1 is a vehicle door beside a driving seat. The vehicle information obtained by the mobile phone 110 from the NFC tag includes task information for opening a vehicle door, but does not include an identifier of the vehicle door. In this case, the mobile phone 110 may display four vehicle doors on the UI, to prompt the user to select a vehicle door that needs to be opened. When the user wants to open the vehicle door beside the driving seat, the user may tap an icon of the vehicle door 1 on the UI, and the mobile phone 110 generates control information for opening the vehicle door 1, so as to control the vehicle 120 to open the vehicle door beside the driving seat, thereby meeting a personalized requirement of the user.

In embodiments, the mobile phone 110 may encrypt the control information based on a session key, to generate the encrypted control information, so as to enhance security of the vehicle control system.

S240: The mobile phone 110 sends the control information to the vehicle 120.

The control information may be a specific instruction, for example, an instruction for controlling opening of a vehicle door. After receiving the instruction, the vehicle 120 directly performs an operation of opening the vehicle door. The control information may also be indication information, for example, a value "1". After receiving the value "1", the vehicle 120 determines, based on a locally stored "value-instruction" mapping table, that an instruction corresponding to the value "1" is an instruction for starting a player, and then starts the music player. A specific form of the control information is not limited in this application.

The mobile phone 110 may send the control information to the vehicle 120 through a Bluetooth connection. The control information may be carried in a protocol data unit (PDU) of a Bluetooth data packet. A specific manner of sending the control information is not limited in this application.

S250: The vehicle 120 controls the vehicle based on the control information.

For example, when the control information is an instruction for opening a vehicle door, the vehicle 120 opens the vehicle door based on the instruction; or when the control information is an instruction for opening a trunk, the vehicle 120 opens the trunk based on the instruction.

In the method shown in FIG. 2, after enabling the NFC function of the mobile phone 110, the user only needs to control the mobile phone 110 to approach the NFC tag to control the vehicle 120. In a process of controlling the vehicle 120, the mobile phone 110 may be in a screen-off state throughout the process, and the user does not need to perform an operation in an interface of the mobile phone 110, thereby enhancing user experience.

The mobile phone 110 may also generate a registry including the vehicle identifier and/or the application program identifier. After the vehicle identifier is read from the NFC tag, if the vehicle identifier or the application program identifier corresponding to the vehicle identifier is found in the registry, S230 and S240 are performed in a screen-off state; or if the vehicle identifier or the application program identifier corresponding to the vehicle identifier is not found in the registry, the screen is turned on to prompt the user to determine whether to perform S230 and S240, thereby enhancing security of the vehicle control system. In addition, in the vehicle control system, vehicle 120 does not need to be provided with an active NFC apparatus, thereby reducing vehicle costs.

Figure 4:
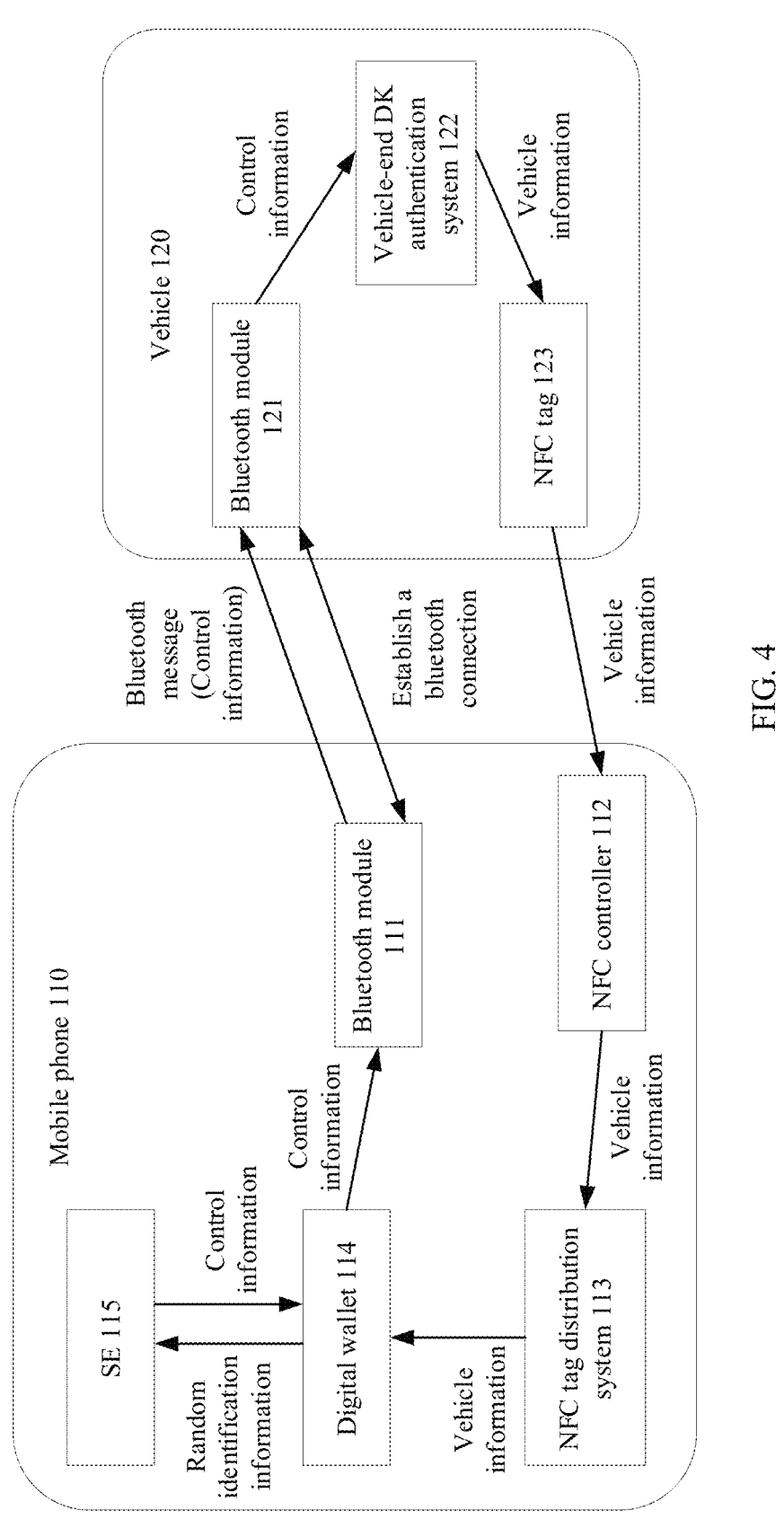
FIG. 4 is a schematic diagram of another vehicle control method according to this application.

The following further describes, with reference to FIG. 4, a vehicle control method provided in this application.

A Bluetooth module 121 of the vehicle 120 may complete pairing with a Bluetooth module 111 of the mobile phone

110 in advance. When a distance between the mobile phone 110 and the vehicle 120 meets a Bluetooth communication distance requirement, the mobile phone 110 establishes a Bluetooth connection to the vehicle 120, and generates a session key.

In embodiments, a vehicle-end DK authentication system 122 may write vehicle information into an NFC tag 123 after a Bluetooth connection is established. The vehicle information includes, for example, a uniform resource locator (URL), random identification information, and service data. The URL is used to indicate an application program corresponding to the vehicle information. The random identification information is associated with a to-be-executed task. The service data includes, for example, data such as a vehicle identifier, Bluetooth connection identifier information, and a Bluetooth connection life cycle.

After the user controls the mobile phone 110 to approach the NFC tag 123, an NFC controller 112 of the mobile phone 110 reads vehicle information from the NFC tag 123.

The NFC controller 112 transmits the vehicle information to an NFC tag distribution system 113. The NFC tag distribution system 113 parses the URL in the vehicle information, determines that an application program corresponding to the vehicle information is a digital wallet 114, and may encapsulate the vehicle information in an intent message and transmit the intent message to the digital wallet 114. The digital wallet 114 is an example application program for processing vehicle information, and the mobile phone 110 may further process the vehicle information by using another application program.

The digital wallet 114 obtains the random identification information from the vehicle information, and sends the random identification information to a secure element (SE) 115. The SE 115 encrypts the random identification information by using the session key, to generate the control information. Then, the digital wallet 114 obtains the control information from the SE 115, encapsulates the control information into a Bluetooth message, and sends the Bluetooth message by using the Bluetooth module 111.

After receiving the Bluetooth message, the Bluetooth module 121 of the vehicle 120 parses out the control information from the Bluetooth message, and transmits the control information to the vehicle-end DK authentication system 122. The vehicle-end DK authentication system 122 verifies the control information by using the session key. After the verification succeeds, the vehicle-end DK authentication system 122 executes a to-be-executed task corresponding to the random identification information in the control information, for example, opening a vehicle door.

In the foregoing embodiment, the vehicle information includes specific task information (for example, random identification information), and the mobile phone 110 can generate explicit control information based on the task information. If the vehicle information does not include specific task information, the mobile phone 110 may prompt the user to select a to-be-executed task.

Figure 5:
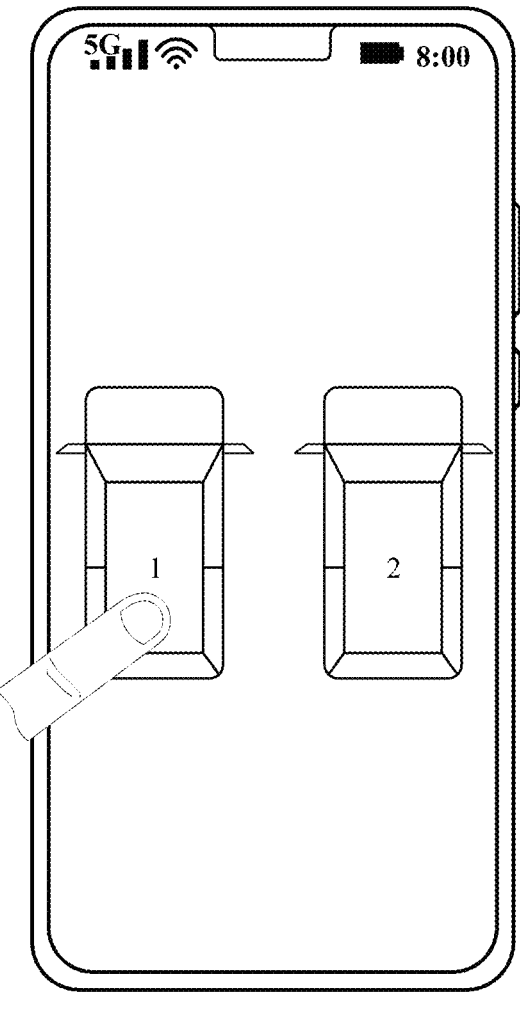
FIG. 5 is a schematic diagram of still another vehicle control method according to this application.

For example, the vehicle information obtained by the mobile phone 110 includes task information for starting a vehicle, but does not include an identifier of the vehicle. However, the mobile phone 110 stores information about two vehicles of the user, and the mobile phone 110 may display a UI shown in FIG. 5. If the user taps an icon of a vehicle 1 (for example, a vehicle 120), the mobile phone 110 may generate control information for starting the vehicle 1, encrypt the control information by using a session key, and then send the control information to the vehicle 1, so as to meet a personalized requirement of the user.

Figure 6:
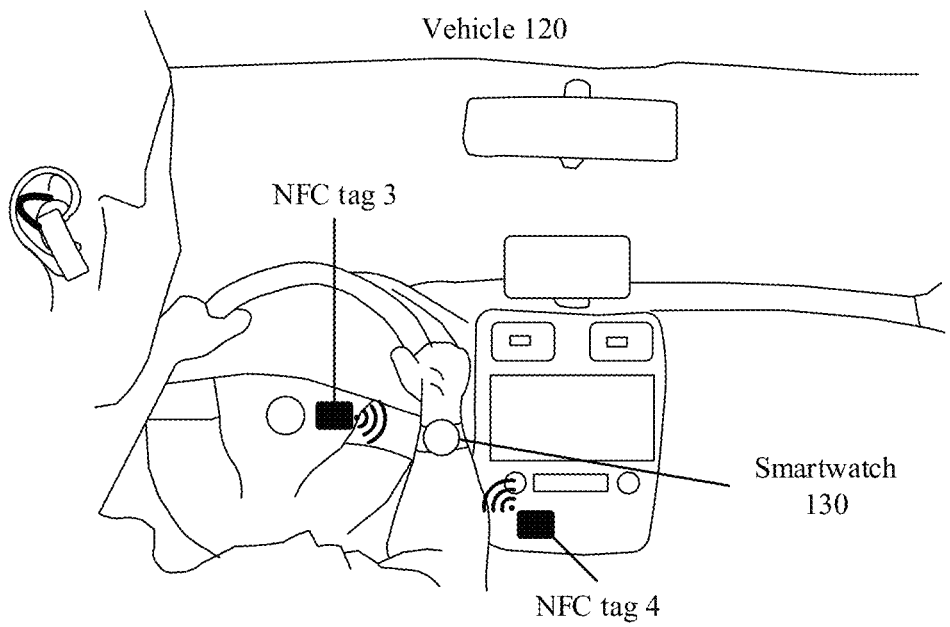
FIG. 6 is a schematic diagram of another vehicle control system according to this application.

In addition, the user may further use a smartwatch to control interaction with the vehicle 120. As shown in FIG. 6, a smartwatch 130 includes a Bluetooth module and an active NFC module, and the vehicle 120 includes an NFC tag 3 and an NFC tag 4. The NFC tag 3 is attached to a steering wheel and includes vehicle information for enabling steering wheel heating. The NFC tag 4 is attached to a central control console and includes vehicle information for enabling a ventilation function.

Figure 7:
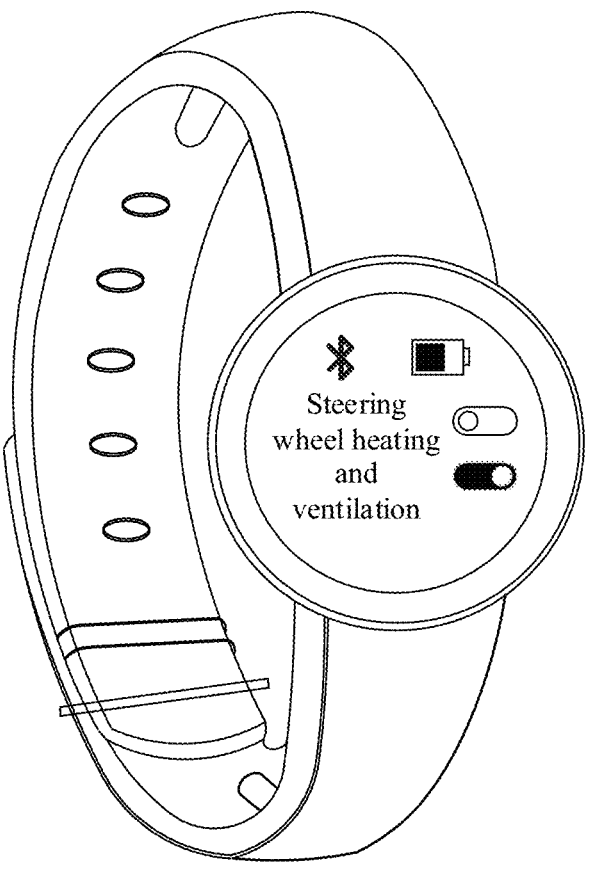
FIG. 7 is a schematic diagram of still another vehicle control method according to this application.

After the smartwatch 130 establishes a Bluetooth connection to the vehicle 120, the smartwatch 130 approaches the smartwatch 130, the NFC tag 3, and the NFC tag 4, and may read vehicle information in the NFC tag 3 and vehicle information in the NFC tag 4. Because vehicle ventilation causes a poor heating effect of the steering wheel, the smartphone 130 may turn on a screen and display a UI shown in FIG. 7, to prompt the user to choose whether to perform steering wheel heating and ventilation at the same time.

The user may tap a steering wheel heating switch icon to enable a steering wheel heating function. In this case, the smartwatch 130 generates, based on the vehicle information in the NFC tag 3, an instruction for enabling steering wheel heating, and sends the instruction to the vehicle 120 by using a Bluetooth connection. The user may further tap a switch icon of the ventilation function to disable the ventilation function. In this case, the smartwatch 130 discards the vehicle information in the NFC tag 4, so as to meet a personalized requirement of the user.

The foregoing describes in detail an example of the vehicle control method provided in this application. It can be understood that, to implement the foregoing functions, a corresponding apparatus includes a corresponding hardware structure and/or software module for executing the functions. A person skilled in the art should easily be aware that, in combination with units and algorithm operations of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In this application, the vehicle control apparatus may be divided into functional units based on the foregoing method examples. For example, each function may be divided into functional units, or two or more functions may be integrated into one unit. The integrated unit may be implemented in a form of hardware, or may be implemented in a form of a software functional unit. It needs to be noted that, in this application, division into the units is an example, and is merely a logical function division. During actual implementation, another division manner may be used.

Figure 8:
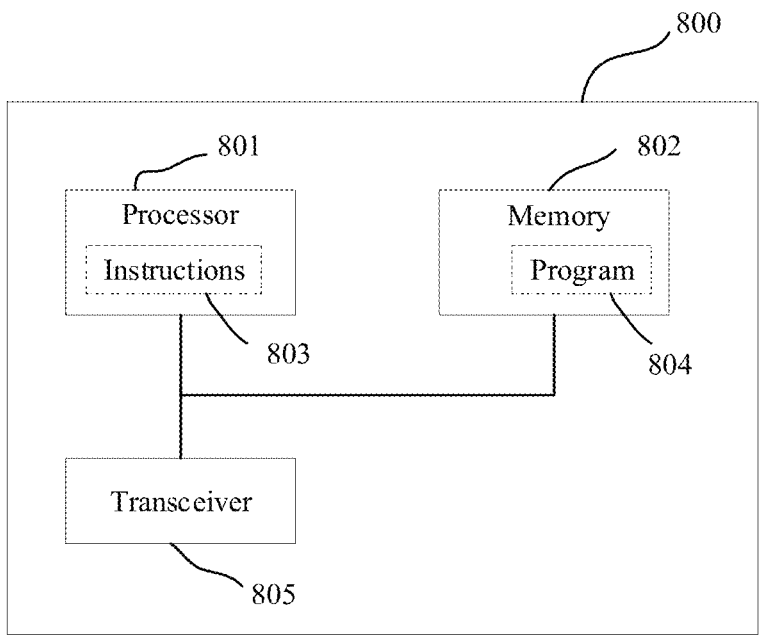
FIG. 8 is a schematic diagram of an electronic device for controlling a vehicle according to this application.

FIG. 8 is a schematic diagram of a structure of an electronic device for controlling a vehicle according to this application. A device 800 may be configured to implement the method described in the foregoing method embodiments. The device 800 may be a terminal device or a chip.

The device 800 includes one or more processors 801. The one or more processors 801 can support the device 800 to implement the method in the method embodiments. The processor 801 may be a general-purpose processor or a dedicated processor. For example, the processor 801 may be a central processing unit (CPU). The CPU may be configured to control the device 800, execute a software program, and process data of the software program. The device 800 may further include a transceiver 805, configured to input (e.g., receive) and/or output (e.g., send) a signal (for example, vehicle information).

For example, the device 800 may be a chip, and the transceiver 805 may be an input and/or output circuit of the chip. Alternatively, the transceiver 805 may be a communications interface of the chip, and the chip may be used as a component of a terminal device or another electronic device.

For another example, the device 800 may be a terminal device, and the transceiver 805 may be a transceiver circuit of the terminal device.

The device 800 may further include one or more memories 802, which store a program 804. The program 804 may be run by the processor 801 to generate an instruction 803, so that the processor 801 performs the method described in the foregoing method embodiments based on the instruction 803. In embodiments, the memory 802 may further store data (for example, vehicle information). In embodiments, the processor 801 may further read the data stored in the memory 802, where the data may be stored at a storage address the same as that of the program 804, or the data may be stored at a storage address different from that of the program 804.

The processor 801 and the memory 802 may be separately disposed, or may be integrated together, for example, integrated on a system on chip (SOC) of a terminal device.

When the device 800 is a mobile terminal, the transceiver 805 is configured to: establish a short-range communication connection to a vehicle; read vehicle information from a passive NFC apparatus in the vehicle; the processor 801 is configured to generate control information based on the vehicle information; and the transceiver 805 is further configured to send the control information to the vehicle by using the short-range communication connection.

When the device 800 is a vehicle-mounted electronic device, the transceiver 805 is configured to: establish a short-range communication connection to a mobile terminal; and receive control information from the mobile terminal by using the short-range communication connection, where the control information is generated by the mobile terminal based on vehicle information, and the vehicle information is information in a passive near field communication NFC apparatus in a vehicle on which the vehicle-mounted electronic device is located; and the processor 801 is configured to control the vehicle based on the control information.

For a specific manner in which the device 800 performs the method embodiment and beneficial effects produced accordingly, refer to related descriptions in the method embodiment.

It should be understood that the operations in the foregoing method embodiments may be completed by using a logic circuit in a form of hardware or instructions in a form of software in the processor 801. The processor 801 may be a CPU, a digital signal processor (DSP), an application-specific integrated circuit (ASIC), a field programmable gate array (FPGA), or another programmable logic device, for example, a discrete gate, a transistor logic device, or a discrete hardware component.

This application further provides a computer program product. When the computer program product is executed by the processor 801, the method according to any method embodiment of this application is implemented.

The computer program product may be stored in the memory 802, for example, may be the program 804. After processing processes such as preprocessing, compilation, assembly, and linking are performed, the program 804 is finally converted into an executable target file that can be executed by the processor 801.

This application further provides a computer readable storage medium, which stores a computer program. When the computer program is executed by a computer, the method according to any method embodiment of this application is implemented. The computer program may be a high-level language program, or may be an executable target program.

For example, the computer-readable storage medium may be the memory 802. The memory 802 may be a volatile memory or a non-volatile memory, or the memory 802 may include both a volatile memory and a non-volatile memory. The nonvolatile memory may be a read-only memory (ROM), a programmable read-only memory (PROM), an erasable programmable read-only memory (EPROM), an electrically erasable programmable read-only memory (EE-PROM), or a flash memory. The volatile memory may be a random access memory (RAM), which is used as an external cache. By way of example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM).

It may be clearly understood by a person skilled in the art that, for ease and brevity of description, for a specific working process and a generated technical effect of the foregoing apparatus and device, reference may be made to a corresponding process and technical effect in the foregoing method embodiments. Details are not described herein again.

In the several embodiments provided in this application, the disclosed system, apparatus, and method may be implemented in other manners. For example, some features of the method embodiments described above may be ignored or not performed. The described apparatus embodiments are merely examples. Division into the units is merely logical function division and may be other division in actual implementation. A plurality of units or components may be combined or integrated into another system. In addition, coupling between the units or coupling between the components may be direct coupling or indirect coupling, and the coupling may include an electrical connection, a mechanical connection, or another form of connection.

Sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

In addition, the term "and/or" in this specification describes only an association relationship for associated objects and represents that three relationships may exist. For example, A and/or B may represent the following three cases: Only A exists, both A and B exist, and only B exists. In addition, the character "/" in this specification generally indicates an "or" relationship between the associated objects.

In conclusion, the foregoing descriptions are merely examples of embodiments of the technical solutions of this application, but are not intended to limit the protection scope of this application. Any modification, equivalent replacement, or improvement made without departing from the principle of this application shall fall within the protection scope of this application.

What is claimed is:

1. A vehicle control method, comprising:
establishing, by a mobile terminal, a short-range communication connection to a vehicle using a first communications protocol;
in response to establishing the short-range communication connection, reading, by the mobile terminal, vehicle information from a passive near field communication (NFC) apparatus in the vehicle using a second communications protocol that is different from the first communications protocol;
generating, by the mobile terminal, control information based on the vehicle information; and
sending, by the mobile terminal, the control information to the vehicle over the short-range communication connection using the first communications protocol;
wherein the vehicle information comprises task information, the task information is in an association relationship with a position of the passive NFC apparatus in the vehicle, and the task information is used to generate the control information; and
wherein the task information is random identification information that is generated randomly each time it is written to the passive NFC apparatus, the random identification information is written into the passive NFC apparatus after the short-range communication connection is established, and the control information comprises the random identification information.

2. The method according to claim 1, wherein the vehicle information comprises an identifier of the vehicle, and/or the vehicle information comprises an identifier of an application program corresponding to the vehicle information.

3. The method according to claim 1, wherein the control information is information encrypted with a session key.

4. The method according to claim 1, wherein the short-range communication connection is a Bluetooth connection, an ultra-wideband (UWB) connection, a ZigBee connection, or a Wireless Fidelity (Wi-Fi) connection.

5. An electronic device, comprising:
one or more processors,
one or more memories, wherein the one or more memories are configured to store computer program, the computer program is executed by the one or more processors, to enable the electronic device to perform:
establishing a short-range communication connection to a vehicle using a first communications protocol;
in response to establishing the short-range communication connection, reading vehicle information from a passive near field communication (NFC) apparatus in the vehicle using a second communications protocol that is different from the first communications protocol;
generating control information based on the vehicle information; and
sending the control information to the vehicle over the short-range communication connection using the first communications protocol;
wherein the vehicle information comprises task information, the task information is in an association relationship with a position of the passive NFC apparatus in the vehicle, and the task information is used to generate the control information; and wherein the task information is random identification information that is generated randomly each time it is written to the passive NFC apparatus, the random identification information is written into the passive NFC apparatus after the short-range communication connection is established, and the control information comprises the random identification information.

6. The electronic device according to claim 5, wherein the vehicle information comprises an identifier of the vehicle, and/or the vehicle information comprises an identifier of an application program corresponding to the vehicle information.

7. The electronic device according to claim 5, wherein the control information is information encrypted with a session key.

8. The electronic device according to claim 5, wherein the short-range communication connection is a Bluetooth connection, an ultra-wideband (UWB) connection, a ZigBee connection, or a Wireless Fidelity (Wi-Fi) connection.

9. An electronic device, comprising:

one or more processors, one or more memories, wherein the one or more memories are configured to store computer program, the computer program is executed by the one or more processors, to enable the electronic device to perform:

establishing a short-range communication connection to a mobile terminal using a first communications protocol;

receiving, using the first communication protocol, control information from the mobile terminal over the short-range communication connection in response to the mobile terminal establishing the short-range communication connection, wherein the control information is generated by the mobile terminal based on vehicle information, and the vehicle information is information read, by the mobile terminal using a second communications protocol that is different from the first communications protocol, from in a passive near field communication (NFC) apparatus in a vehicle on which the electronic device is located; and controlling the vehicle based on the control information;

wherein the vehicle information is written into the passive NFC apparatus after the short-range communication connection is established, wherein the vehicle information comprises task information, the task information is in an association relationship with a position of the passive NFC apparatus in the vehicle, and the task information is used to generate the control information, and wherein the task information is random identification information that is generated randomly each time it is written to the passive NFC apparatus, the random identification information is written into the passive NFC apparatus after the short-range communication connection is established, and the control information comprises the random identification information.

10. The electronic device according to claim 9, wherein the vehicle information comprises an identifier of the vehicle, and/or the vehicle information comprises an identifier of an application program corresponding to the vehicle information.

11. The electronic device according to claim 9, wherein the control information is information encrypted with a session key.

12. The electronic device according to claim 9, wherein the short-range communication connection is a Bluetooth connection, an ultra-wideband (UWB) connection, a ZigBee connection, or a Wireless Fidelity (Wi-Fi) connection.

\* \* \* \* \*